United States Patent
Klapman et al.

(10) Patent No.: US 11,727,156 B2
(45) Date of Patent: Aug. 15, 2023

(54) SECURITY DEVICE FOR A DATA STORAGE DEVICE

(71) Applicant: Western Digital Technologies, Inc., San Jose, CA (US)

(72) Inventors: Matthew Harris Klapman, San Jose, CA (US); Brian Edward Mastenbrook, Fremont, CA (US); Pongsanat Karmpeeraparpsontorn, Pathum Thani (TH); Thantham Panyayodrat, Chai Ya Phum (TH); Suksan Yaowaphak, Phra Nakhon Si Ayutthaya (TH)

(73) Assignee: Western Digital Technologies, Inc., San Jose, CA (US)

( * ) Notice: Subject to any disclaimer, the term of this patent is extended or adjusted under 35 U.S.C. 154(b) by 37 days.

(21) Appl. No.: 17/216,568

(22) Filed: Mar. 29, 2021

(65) Prior Publication Data

US 2022/0309193 A1 Sep. 29, 2022

(51) Int. Cl.
*G06F 21/78* (2013.01)
*G06F 21/85* (2013.01)
*G06F 21/60* (2013.01)
*G06F 21/32* (2013.01)

(52) U.S. Cl.
CPC ............ *G06F 21/78* (2013.01); *G06F 21/32* (2013.01); *G06F 21/602* (2013.01); *G06F 21/85* (2013.01); *G06F 2221/0753* (2013.01)

(58) Field of Classification Search
CPC ........ G06F 21/78; G06F 21/32; G06F 21/602; G06F 21/85; G06F 2221/0753
See application file for complete search history.

(56) References Cited

U.S. PATENT DOCUMENTS

| | | | |
|---|---|---|---|
| 2014/0325642 A1 | 10/2014 | Lee et al. | |
| 2017/0017595 A1* | 1/2017 | Schnell | G06F 13/4286 |
| 2018/0293407 A1* | 10/2018 | Wu | G06F 21/602 |
| 2021/0135870 A1* | 5/2021 | Uy | H04L 9/3218 |

FOREIGN PATENT DOCUMENTS

WO 2017/021687 2/2017

OTHER PUBLICATIONS

International Search Report and Written Opinion for International Application No. PCT/US2021/038169, dated Sep. 13, 2021, 10 pgs.

* cited by examiner

*Primary Examiner* — Ayoub Alata
(74) *Attorney, Agent, or Firm* — Patent Law Works LLP

(57) ABSTRACT

An in-line security device to transfer cryptographic key material, the device comprising: a first connector configured to connect, via wire, with a host device; a second connector configured to connect, via wire, with a data storage device; a pass-through circuit between the first connector and the second connector to facilitate data communication between the host device and the data storage device; and a communication interface to send cryptographic key material to the data storage device via the second connector.

20 Claims, 12 Drawing Sheets

SECURITY DEVICE FOR A DATA STORAGE DEVICE

TECHNICAL FIELD

This disclosure relates to data communication between a host device and a data storage device. In some examples, the security device transfers cryptographic key material to the data storage device to enable communication between the host device and the data storage device.

BACKGROUND

Encryption of data enables secure storage on data storage devices, such as block data storage devices that are connected to host devices via a Universal Serial Bus (USB) cable. However, the user experience is often disappointing because the setup of passwords, keys and the like is cumbersome and complicated for technically unskilled users. If encryption is used, the keys and passwords are too often stored insecurely. As a result, many users leave existing encryption technology effectively unused resulting in exposed confidential data.

In some data storage devices, a physical keypad is provided at the data storage device to enter passwords, keys and the like. In other data storage devices, specialized software or drivers for the data storage device needs to be installed on the host device to enable entry of passwords, keys and the like before secure communication with the data storage device and the host device.

SUMMARY

The present disclosure seeks to facilitate secure data storage at a data storage device. This includes an in-line security device to transfer cryptographic key material to a data storage device. The data storage device can use the cryptographic key material for encryption or decryption of data stored at the data storage device so that the data is securely stored whilst making the data available to a host device.

Disclosed herein is an in-line security device comprising: a first connector, a second connector, a pass-through circuit, and a communication interface. The first connector is configured to connect with a host device and the second connector configured to connect with a data storage device. The pass-through circuit is provided between the first connector and the second connector to facilitate data communication between the host device and the data storage device. The communication interface is configured to send cryptographic key material to the data storage device via the second connector.

In some embodiments, the in-line security device further comprises a cryptographic key memory configured to store at least part of the cryptographic key material.

In some embodiments, the in-line security device further comprises at least one processor configured to: receive a request to send cryptographic key material; and responsive to receiving the request, send the cryptographic key material to the data storage device via the second connector.

In some embodiments, the in-line security device further comprises at least one processor configured to: receive authentication data; verify that the received authentication data corresponds to a record in an authentication data set; and based on verification of the received authentication data, send the cryptographic key material to the data storage device via the second connector. In some embodiments, the in-line security device further comprises at least one processor configured to: receive at least part of the cryptographic key material; verify that the received cryptographic key material corresponds to a record in an authentication data set; and based on verification of the received cryptographic key material, send the cryptographic key material to the data storage device via the second connector.

In some embodiments of the in-line security device, the second connector includes a USB-C Power Delivery (PD) standard connector including: transmit (TX) pins and receive (RX) pins to enable data communication between the host device and data storage device; and channel configuration (CC) pins. The communication interface sends the cryptographic key material to the data storage device via the channel configuration pins of the second connector.

In some embodiments, the in-line security device further comprises a wireless receiver or transceiver to communicate to another electronic device such as a phone or computer to receive cryptographic key material that is then either further processed inside the in-line security device which result is passed to the data storage device via a connector, or the received cryptographic key material is directly passed directly to the data storage device via a connector.

In some embodiments, the in-line security device further comprises: a biometric reader to read biometric data of a user. Based on the biometric data, the communication interface sends cryptographic key material to the data storage device.

In some further embodiments, the biometric reader is a fingerprint scanner.

In some further embodiments, the cryptographic key material is, at least in part, based on the received biometric data.

In some further embodiments, the in-line security device further comprises a processor configured to: receive the biometric data; verify that the received biometric data corresponds to a record in a biometric authentication data set; and based on verification of the received biometric data, send the cryptographic key material to the data storage device via the communication interface and the second connector.

In some embodiments of the in-line security device, the cryptographic key material enables access of a corresponding storage medium, or portion of the corresponding storage medium, in the data storage device.

In some embodiments of the in-line security device, the cryptographic key material is a part of a combined cryptographic key, wherein the combined cryptographic key enables access to the storage medium, or portion of storage medium, in the data storage device.

In some embodiments of the in-line security device, the pass-through circuit is configured to facilitate communication of a further cryptographic key material between the first connector and the second connector.

Disclosed herein is a data storage device comprising: means for selectively connecting to an in-line security device, means for storing data, and a means for cryptography. The means for selectively connecting to an in-line security device comprising: means for receiving a cryptographic key material from the in-line security device; and means for communicating with a host device connected to the in-line security device. The means for storing data is configured to store user content data, wherein access to the storage medium is enabled by the means for cryptography receiving the cryptographic key material from the in-line security device.

In some embodiments of the data storage device, the means for cryptography is configured to use the cryptographic key material to, at least in part, encrypt and decrypt user content data stored on the means for storing user content data.

In some embodiments of the data storage device further comprises means for sending, via the device connector, a request for the cryptographic key material.

In some embodiments of the data storage device, the means for cryptography further comprises: means for receiving a plurality of cryptographic key material from a plurality of in-line security devices, and means for combining the plurality of cryptographic key material to generate a combined cryptographic key, wherein the combined cryptographic key enables access to the means for storing data, or portion of the means for storing data.

In some embodiments of the data storage device, the means for cryptography further comprises: means for receiving a plurality of cryptographic key material, wherein each of the plurality of cryptographic key material enables access to a corresponding portion of the storage medium.

Disclosed herein is a method for a data storage device to communicate with a host device, the method comprising: communicatively coupling, via wire, the host device and the data storage device with an in-line security device; sending a cryptographic key material from the in-line security device to the data storage device; and responsive to receiving the cryptographic key material, enabling data communication to a storage medium, or portion of the storage medium, of the data storage device, wherein data communication between the host device and the storage medium is though the in-line security device.

In some embodiments, the method further comprises: reading, with a biometric reader in-line security device, biometric data of a user, wherein the cryptographic key material is based on the biometric data.

In some embodiments, the method further comprises: receiving authentication data; verifying that the received authentication data corresponds to a record in an authentication data set; and wherein sending the cryptographic key material to the data storage device is based on verification of the received authentication data.

BRIEF DESCRIPTION OF DRAWINGS

Examples of the present disclosure will now be described with reference to the following drawings.

DESCRIPTION OF EMBODIMENTS

Overview

Figure 1:
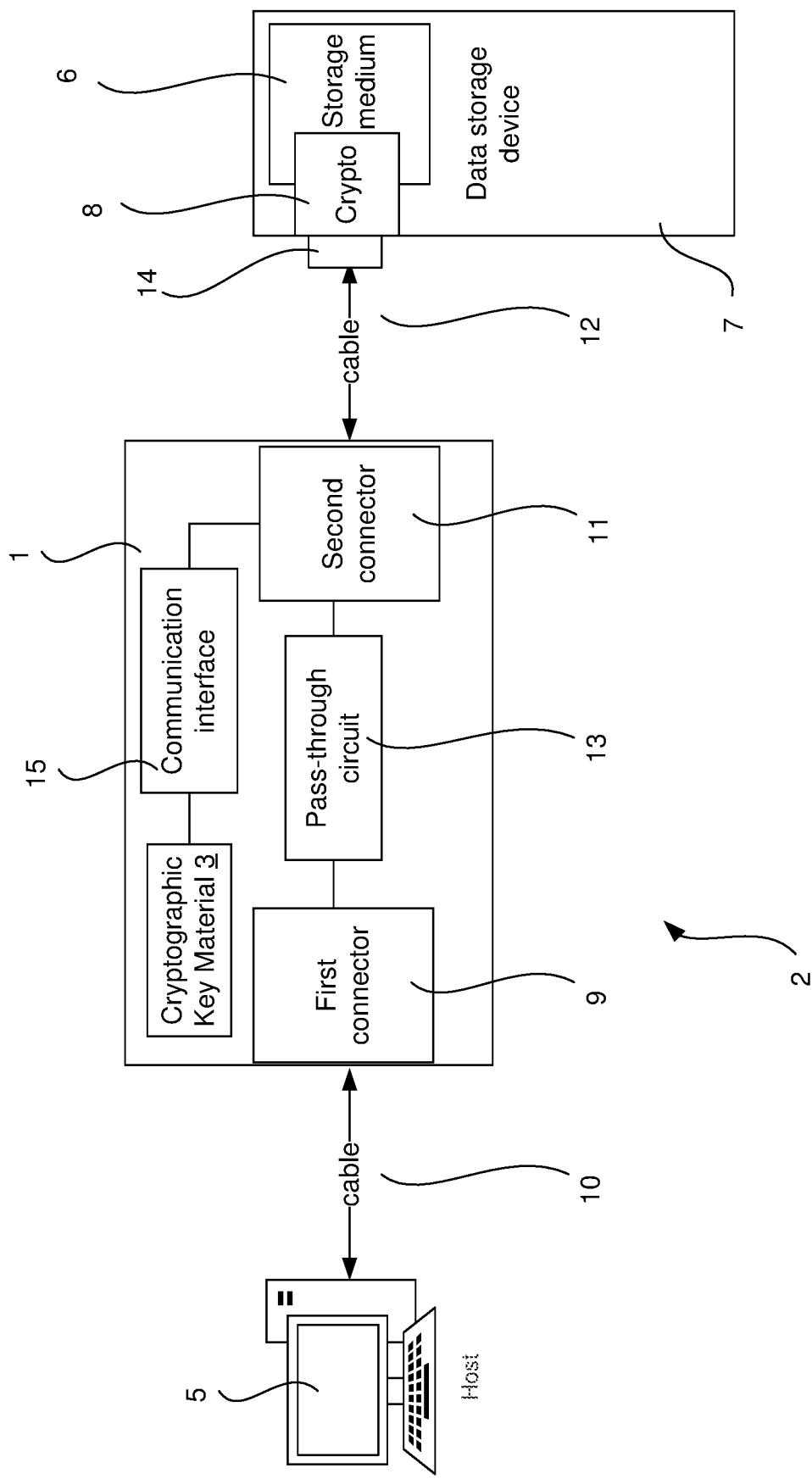
FIG. 1 is a schematic diagram of a secure data storage device system according to a first example including an in-line security device that connects between a data storage device and a host device.

FIG. 1 illustrates a secure data storage device system 2 that includes an in-line security device 1 that connects between a host device 5 and a data storage device 7. The host device 5 can include a computer, such as desktop computer, laptop computer, tablet, portable communication device, media player, or other electronic devices that can host peripheral devices. The data storage device 7 may include physical data storage medium 6 such as solid state drives (SSD) and hard disk drives (HDD).

The in-line security device 1 includes a first connector 9 to connect to the host device 5 and a second connector 11 to connect to the data storage device 7. Typically, this may include a connection with wire or cables 10, 12 that enable selective connection of the in-line security device 1 to the host device 5 and the data storage device 7. This can include using industry standards such as Universal Serial Bus (USB standard) cables and connectors.

Figure 2:
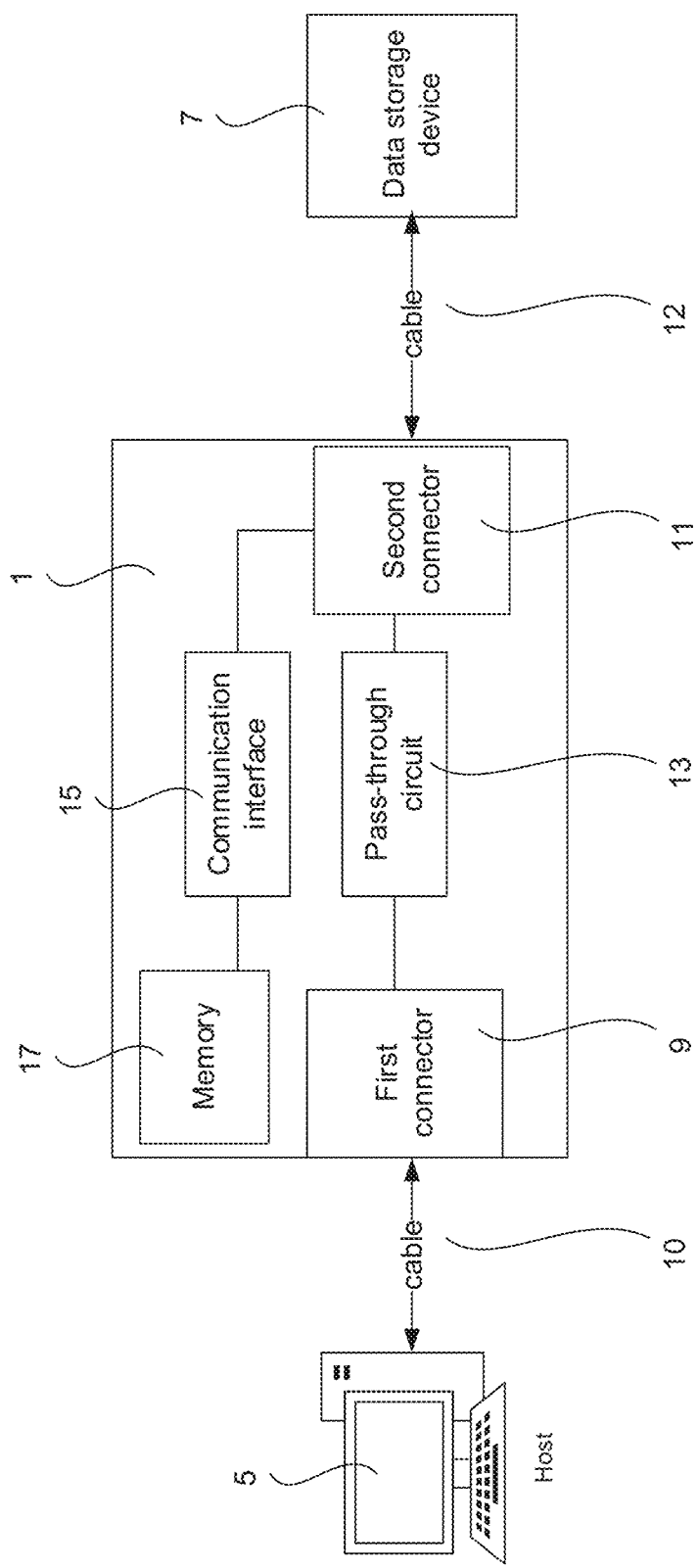
FIG. 2 is a schematic diagram of a second example of a secure data storage device system wherein the in-line security device includes a memory to store cryptographic key material.
Figure 4:
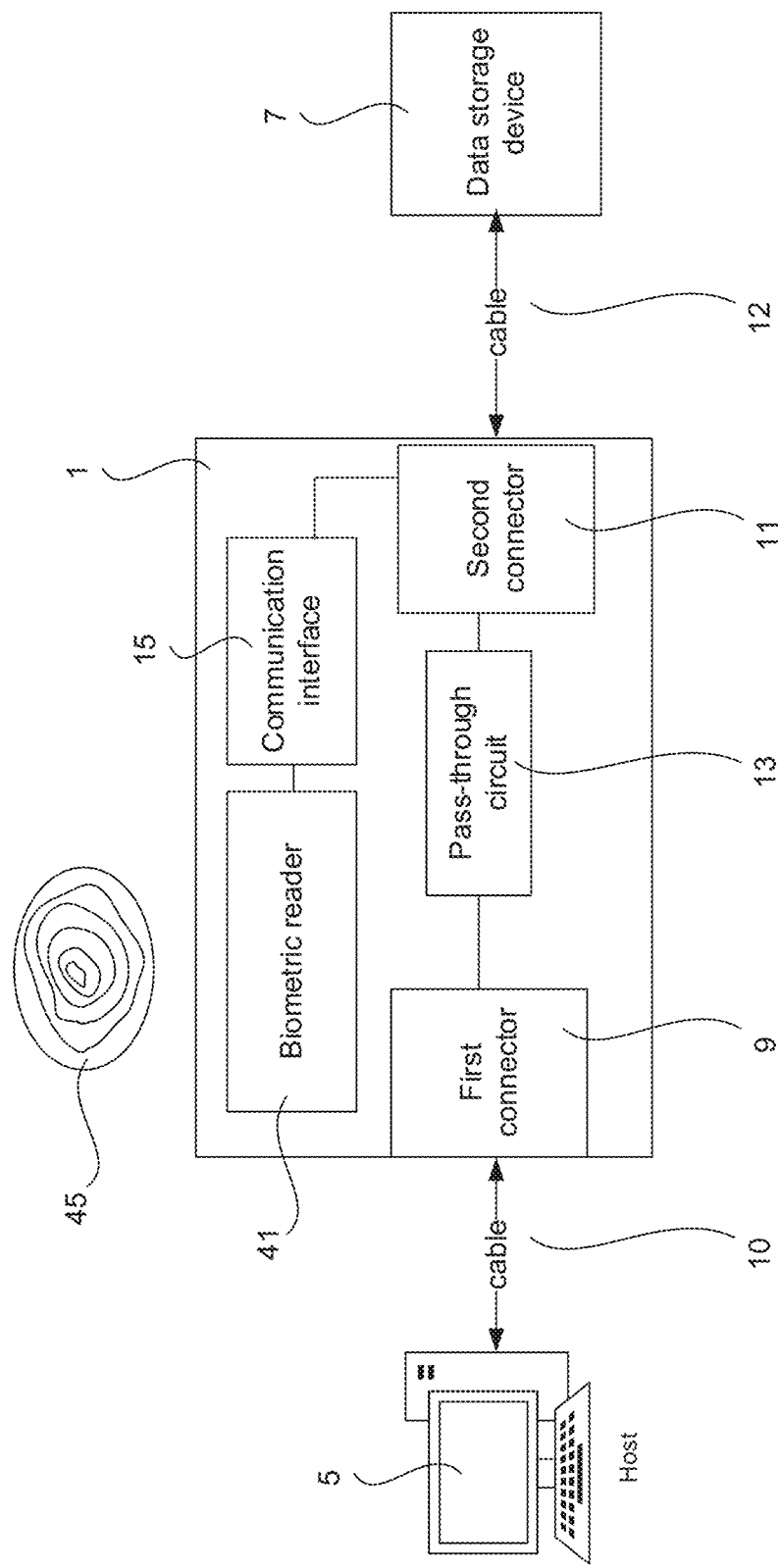
FIG. 4 is a schematic diagram of a fourth example of a secure data storage device system wherein the in-line security device includes a biometric reader.

The in-line security device 1 also includes a pass-through circuit 13 between the first connector 9 and the second connector 11 to facilitate data communication between the host device 6 and the data storage device 7. The in-line communication device 1 also includes a communication interface 15 to send cryptographic key material 3 to the data storage device 7 via the second connector 11. The in-line security device can function as a security fob to transfer the cryptographic key material. In some examples (as illustrated in FIG. 2), the cryptographic key material 3 is stored in a cryptographic key memory 17 of the in-line security device. In some alternative examples (as illustrated in FIG. 4), cryptographic key material 3 includes biometric data 45 (e.g. fingerprint data) that is read from a biometric reader 41 associated with the in-line security device 1.

A general example of use of the data storage system 2 will now be described with reference to FIG. 1 and the solid boxes in FIG. 9. The host device 5 and data storage device 7 start communicatively decoupled from one another. For example, one or both of these devices 5, 6 are portable devices that may be movable and thus disconnected from time to time. A user communicatively couples 101 the host device 5 and data storage device 7 together with the in-line security device 1. In some examples, this may include using cables 10, 12, such as those conforming to the USB-C standard (discussed in further detail below), to connect the devices 5, 7 together.

The in-line security device 1 sends 130 cryptographic key material 3 to the data storage device 7. In turn, the data storage device 7 receives 140 the cryptographic key material 3 to enable 150 the host device 5 to access the storage medium 6, or a portion of the storage medium 6, of the data storage device 7. In some examples, this is achieved by a cryptography engine 8 at the data storage device 7 that encrypts and decrypts data stored in the storage medium 6 based on the cryptographic key material 3. Furthermore, data communication 160 between the host device 5 and data storage device 7, which may include transfer of data to and from the storage medium 6, is through the in-line security device 1. This is achieved by the pass-through circuit 13 of the in-line security device 1.

An advantageous function of the secure data storage system 2 includes using a physical security device (the in-line security device 1) to enable access to data in the data storage device 7. Such an in-line security device 1 can be small and portable so that the device 1 can be in convenient physical custody of an authorized user. The authorized user can carry the device 1 and connect the device 1 to use the data storage device 7 and disconnect and take away the device 1 at other times.

Furthermore, the in-line security device 1 has the further function of facilitating data communication between the host device 5 and the data storage device 7. In some examples, only one cable and/or device needs to be connected to the data storage device 7. This reduces components at the data storage device 7. This is in contrast to other systems that may require a separate cable and connector for data transfer between a host device and data storage device plus a separate connector to connect to a physical security device.

First Example of the In-Line Security Device 1 and Data Storage Device

Additional features of the in-line security device 1 will now be described with reference to FIG. 1.

Connectors 9 and 11

Figure 6:
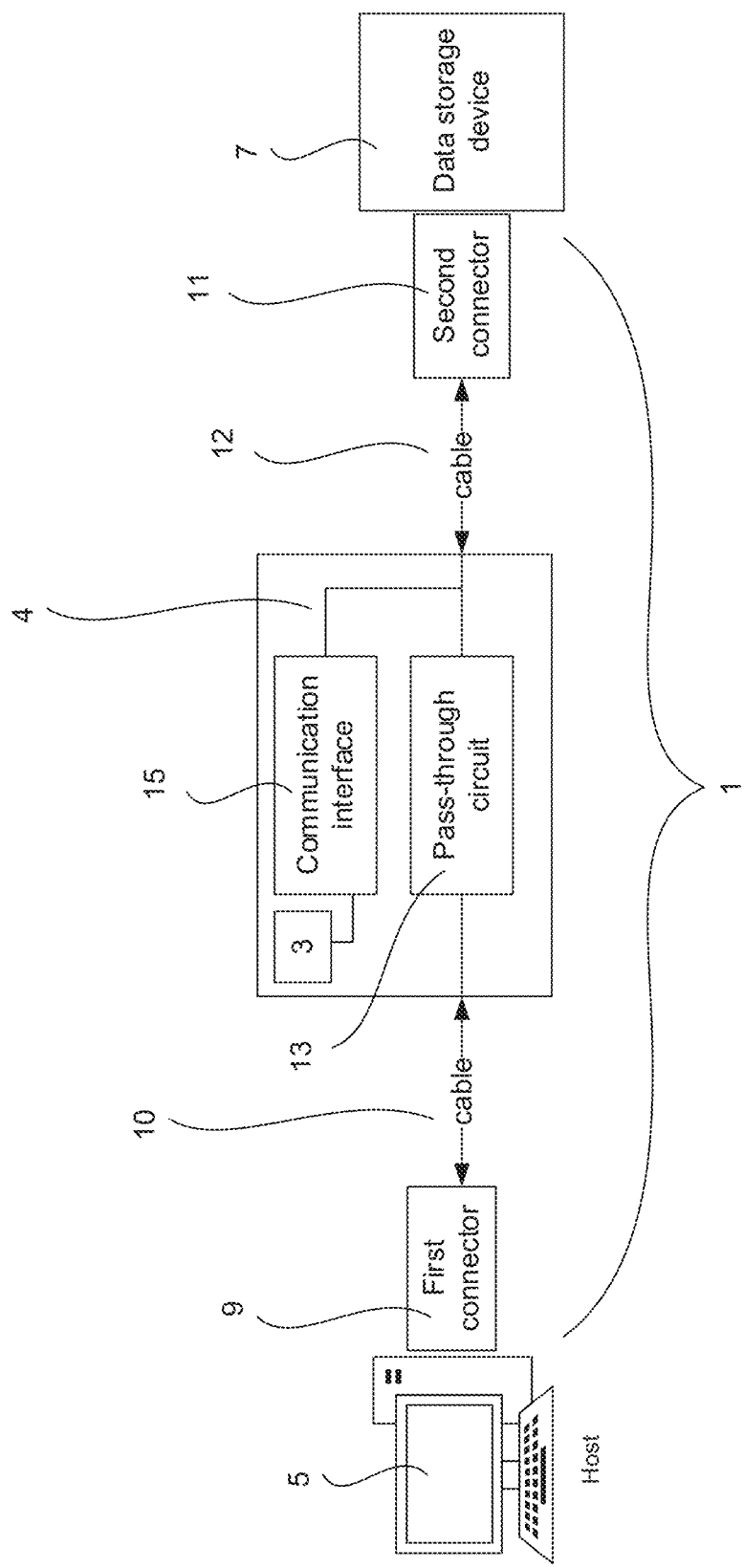
FIG. 6 is a schematic diagram of a sixth example of a secure data storage device system wherein the in-line security device includes a cable.

Referring to FIG. 1, the in-line security device 1 includes first and second connectors 9, 11 at a body of the in-line security device 1. Thus separate cables 10, 12 are used to connect the in-line security device 1 to the host device 5 and data storage device 7. However, it is to be appreciated that one or more of the cables 10, 12 may be integral to the in-line security device 1 (as illustrated in FIG. 6). In other examples, the first and/or second connectors 9, 11 may enable direct connection with corresponding connectors of the host device 5 and data storage device 7 without an intermediate cable.

In some examples, the connectors 9, 11 utilize the USB-C standard. This may include using the 24-pin connector system for USB-C. In some specific examples, this includes using components compatible with USB PD (Power delivery).

In some examples the in-line security device 1, with the pass-through circuit 13, passes the circuit to corresponding pins from the first connector 9 to the second connector 11. This can include the power, ground, TX pins, and RX pins so that the host device 5 can be in data and power communication with the data storage device 7. In particular, the host device 5 may function as the host whilst the data storage device 7 is a peripheral.

In some examples, the channel configuration (CC) pins (such as A5 and B5 pins of the USB-C standard) are used to send the cryptographic key material 3, via the second connector 11, to the data storage device 7. In some examples, the corresponding channel configuration pins from the first and second connectors 9, 11 are decoupled from each other so that the cryptographic key material 3 is only sent to the data storage device 7 and not the host device 5. This reduces security issues that may be associated with sending the cryptographic key material 3 to the host device 5. In alternative examples, the channel configuration pins may be selectively decoupled (or otherwise filtered) during transmission of the cryptographic key material 3, but selectively coupled at other times. This can enable normal channel configuration functions at other times between the host device 5 and the data storage device 7.

Communication Interface 15

Figure 3:
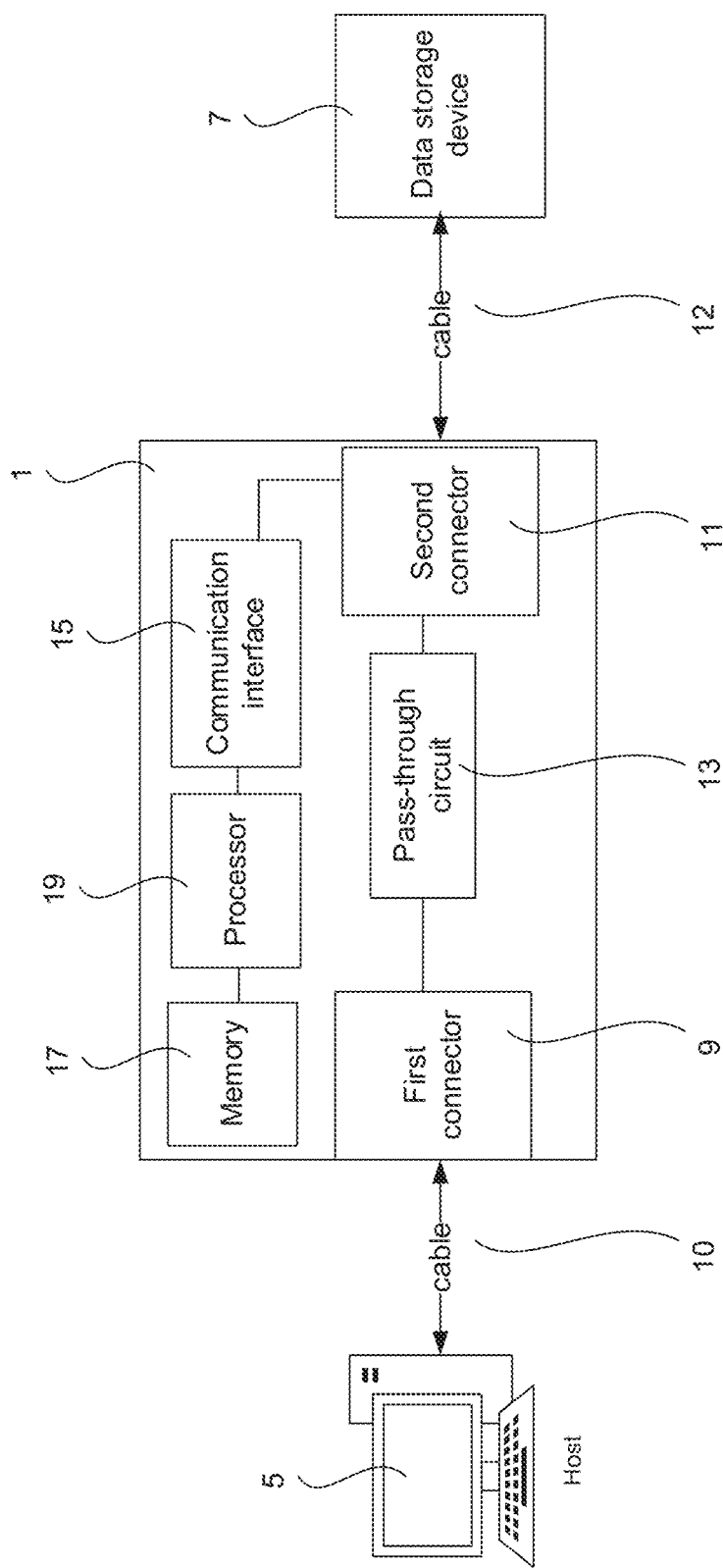
FIG. 3 is a schematic diagram of a third example of a secure data storage device system wherein the in-line security device includes a processor to perform additional functions.
Figure 5:
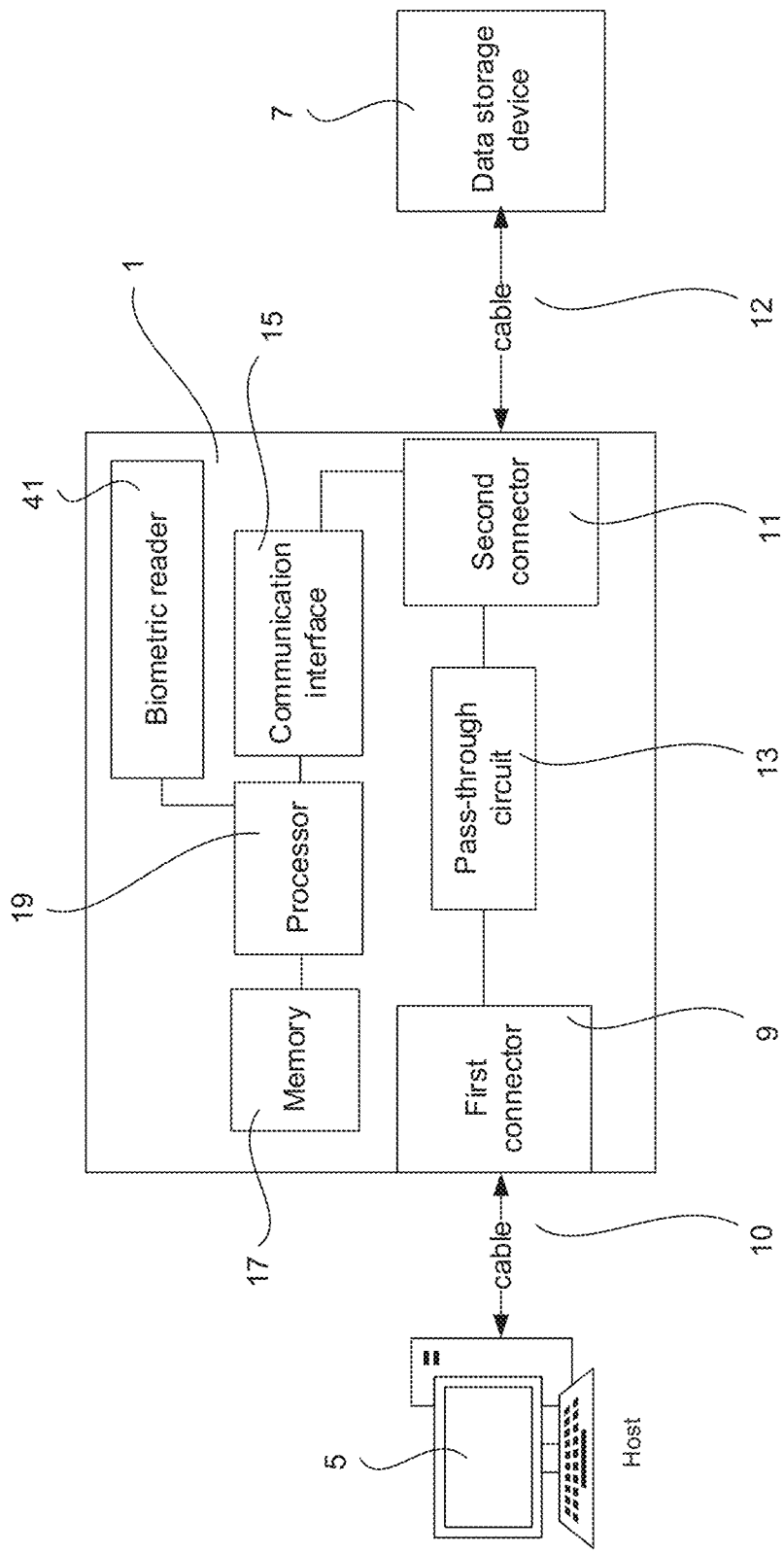
FIG. 5 is a schematic diagram of a fifth example of a secure data storage device system wherein the in-line security device includes a biometric reader for authentication at the in-line security device.
Figure 7:
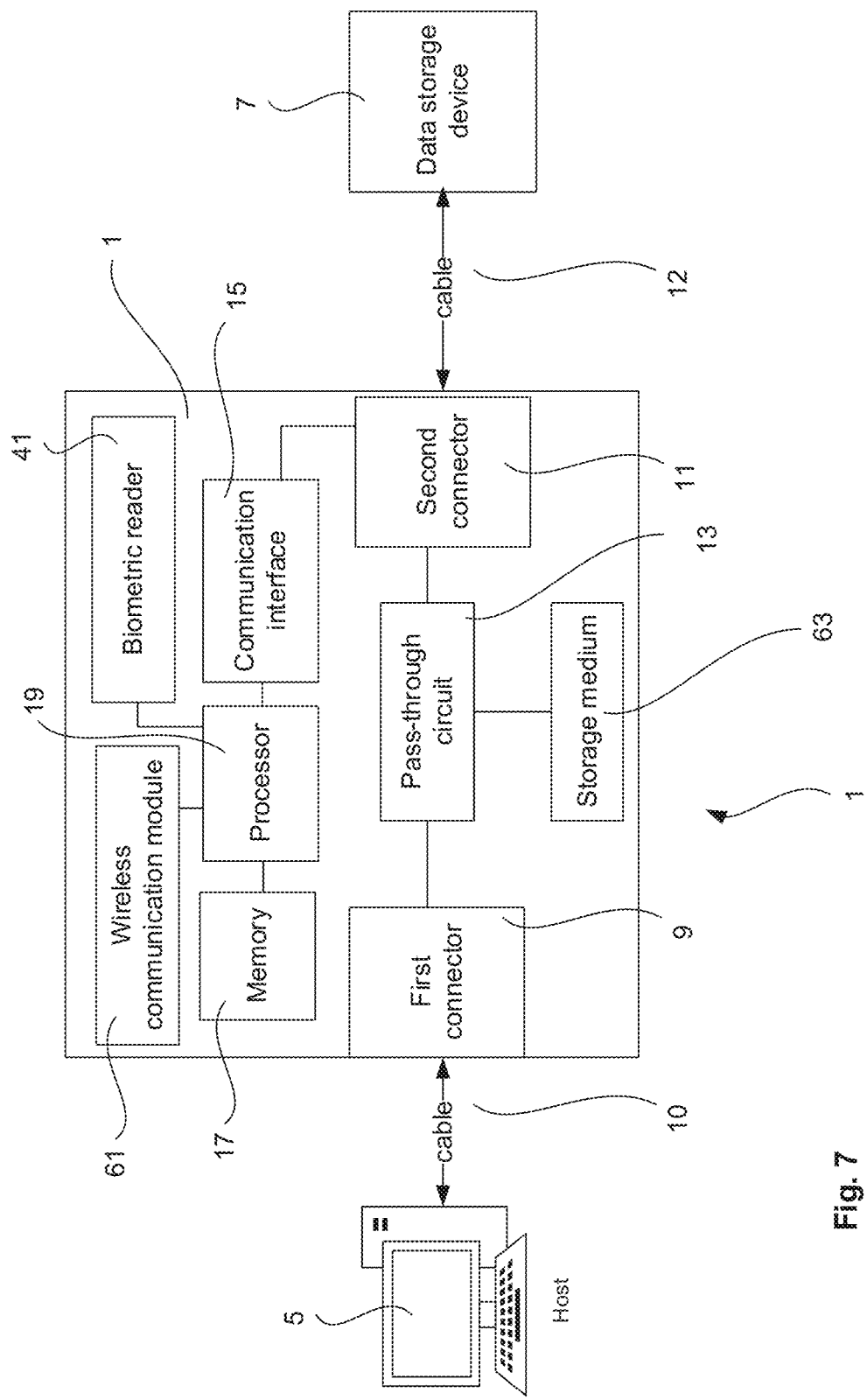
FIG. 7 is a schematic diagram of a seventh example of a secure data storage device system wherein the in-line security device includes an internal storage medium and a wireless communication module.

The communication interface 15 functions to send the cryptographic key material 3 to the second connector 11. In some examples, this includes interfacing a source of the cryptographic key material 3 to the channel configuration pins of the second connector 11. In some examples, the communication interface 15 may actively transmit a signal carrying the cryptographic key material to the second connector 11. For example, the communication interface 15 may receive the cryptographic key material 3 from a memory 17 (as illustrated in FIG. 2), biometric reader 41 (as illustrated in FIG. 4), or a processor 19 (as illustrated in FIGS. 3, 5 and 7), and then transmit the cryptographic key material 3 on a carrier signal to the second connector 11.

In some examples, the communication interface 15 may be configured to send the cryptographic key material 3 in encrypted form. This may be useful to prevent interception of the cryptographic key material. For example, the data storage device 7 may send a public key (of a public and private key pair) to the in-line security device 1. The in-line security device 1 may then encrypt the cryptographic key material 3 with the public key and send that to the data storage device (via the second connector 11). At the data storage device 7, the corresponding private key is then used to decrypt the received data to obtain the cryptographic key material 3. Advantageously, even if a nefarious actor intercepts the signal between the in-line communication device 1 and the data storage device 7, that actor will not be able to determine the cryptographic key material 3. In some examples, the public and private key pairs may be dynamically changed at the data storage device for each use to further increase security.

In other examples, the communication interface 15 may be a passive component that connects the source of the cryptographic key material 3 (such as a memory 17) to the second connector 11, such that the memory 17 is read by the data storage device 7.

Pass-Through Circuit 13

The pass-through circuit 13 communicatively connects the first connector 9 and second connector 11. In particular, connecting pins that are required for data communication and/or power communication between the host device 5 and data storage device 7. In some examples, this can include a one for one match of all the pins between the first and second connectors 11 (such as all 24 pins of the USB-C connector).

This may be acceptable in some examples where the cryptographic key material 3 is transmitted from the in-line security device 1 in encrypted form, so that even if the signal (such as from the channel configuration pins) is received at the host device 5, the cryptographic key material is not revealed at that device 5. It is to be appreciated that in some examples, the pass-through circuit 13 (or the communication interface 15) includes, is part of, or otherwise associated with a USB hub. Such a USB hub can facilitate communication between the host 5 and data storage device 7 (via first and second connectors 9, 11) as well with the memory 17, communication interface 15, processor 19, etc. This can enable, for example, the injection of the initial cryptographic key material 3 via the first or second connector 9, 11 into the memory 17. This can be done at the factor or in the field by the end user.

In other examples, all pins are passed through with the exception of one or more pins used for sending the cryptographic key material 3. As noted above, this can include pins such as the channel configuration pins A5, B5 of the USB-C standard are disconnected or selectively disconnected between the first and second connector 9, 11. This can be used to prevent transmission of the cryptographic key material 3 to the host device 5 and to reduce brute-force attacks from host device 5 if the host 5 is used to manage the cryptographic key material 3.

Data Storage Device 7

The features of the data storage device will now be described with reference to FIG. 1. For brevity, these features are not illustrated in the Figures for the other examples but it will be appreciated that such features can also apply to those examples.

The data storage device 7 can register with the host device 5 as a mass data storage device to provide the functionality to the operating system of the host device 5 of a block data storage device. FIG. 1 shows the data storage device 7 including a storage medium 6 and a cryptography engine 8. The cryptography engine 8 is configured to encrypt and decrypt data stored in the storage medium 6. Generally (and assuming authorized use of the system 2), data from the host device 5 is encrypted and stored in the storage medium. Conversely, encrypted data is read from the storage medium, decrypted by the cryptography engine 8, and sent to the host device 5. The data storage device 7 also includes a device connector 14 to facilitate connection from the in-line security device and the data storage device 7. The device connector 14 may include a USB-C connector.

Storage Medium 6

Data storage device 7 includes a non-transitory storage medium 6 to store user content data. For secure storage, with the in-line security device 1, the storage medium 6 is configured to store encrypted user content data. The user content data is the data that a user would typically want to store on a data storage device, such as files including image files, documents, video files, etc. The storage medium may be flash memory such as in a solid state drive (SSD), hard disk drive (HDD) with a rotating magnetic disk or other non-volatile storage media. In other examples, the data storage device includes magnetic storage such as a tape drive. In yet further examples, the data storage device can be a combination of flash memory and magnetic storage such as a hybrid drive. Further, the storage medium may be a block data storage device, which means that the user content data is written in blocks to the storage medium 6 and read in blocks from the storage medium 6.

In some examples, it may be desirable to have part of the storage medium 6 to store unencrypted user content data. For example, it may be desirable to have a portion of the storage medium 6 that is shared and does not require use of the in-line security device 1 or a particular cryptographic key material 3.

Cryptography Engine 8

In one example, storage medium 6 is associated with a cryptography engine 8 in the form of a dedicated and/or programmable integrated circuit that encrypts data to be stored on storage medium 6 and decrypts data to be read from storage medium 6. In such examples, the storage medium may provide a Small Computer System Interface (SCSI) or Advanced Technology Attachment (ATA) command set according to the Opal specification by the Trusted Computing Group (TCG).

The cryptography engine 8 is provided schematically between the device connector 3 and the storage medium 6 and is configured to use a cryptographic key to encrypt user content data to be stored on the storage medium 6 and to decrypt the encrypted user content data stored on the storage medium 6. In particular, encryption and decryption is based on the in-line security device 1 sending the cryptographic key material 3 to the data storage device 7 and, in turn, the cryptography engine 8.

It is to be appreciated that variations to the concept can include additional authentication layers based on security needs. For example, the cryptography engine 8 (or another part of the data storage device 7), may generate or use private and public key pairs to ensure secure transmission of the cryptographic key material 3 from the in-line security device 1 to the data storage device 7. This can include using different private and public key pairs on a rolling basis (or dynamic generation of new private and public key pairs), wherein a new public key is sent from the cryptography engine to the in-line security device 1 upon a new session, or new connection/coupling of the in-line device 3 with the data storage device 7.

In yet other examples, other authentication methods such as passwords (entered via the host device 5 or at the in-line security device) may be used to provide additional levels of security. Such authentication may be verified at the in-line security device and/or the data storage device 7.

In some examples, the cryptographic key material 3 enables access to the entire corresponding storage medium 6. In other examples, the cryptographic key material 3 (and cryptography engine 8) may be configured to enable access to a portion of the corresponding storage medium 6. For example, the storage medium 6 may be partitioned to multiple portions where access to the data in those portions require a respective cryptographic key material 3. This may be useful where multiple users (or user profiles, or projects) are required to access the same physical data storage device 7. In other examples, this may be useful where a task or project has an in-line security device 1 with the cryptographic key material 3 and wherein data for multiple projects may be stored in portions of the storage medium 6. This can assist in preventing inadvertent, or nefarious, access to data for projects by a user (by not having possession of the correct in-line security device 1).

In other examples, the cryptography engine 8 may be configured to combine cryptographic key material from multiple in-line security devices 1. For examples, a security policy dictates that access to data in the storage medium 6 requires two different users to present their respective in-line security devices 1. As will be described later in the example shown in FIG. 8, the in-line security devices 1 are connected in-line between the host device 5 and the data storage device 7. The cryptographic key material 3 from the different in-line security devices 1 are sent to the data storage device 7, where the cryptography engine 8 combines the received cryptographic key material 3 to form a combined cryptographic key. The combined cryptographic key enables access to the storage medium 6, or respective portion of the storage medium 6.

Second Example of the In-Line Security Device 1 with Cryptographic Key Memory 17

FIG. 2 illustrate an example of the in-line security device 1 with a cryptographic key memory 17 to store the cryptographic key material 3. The cryptographic key memory 17 may include non-volatile memory, read-only memory, write once read many memory, etc. The memory 17 may store multiple cryptographic key material 3. The multiple cryptographic key material 3 may each correspond to respective data storage devices 7. For example, a single user of a particular in-line security device 1 configures that in-line security device to store the multiple cryptographic key materials 3 for the data storage devices 7 that they wish to use.

The cryptographic key material 3 may be read from the cryptographic key memory 17 and be sent, via the communication interface 15, to the second connector 11. In some alternative examples, the cryptographic key material 3 is read from the cryptographic key memory 17, and further encrypted before it is sent via the second connector 11 to the data storage device 7.

Third Example of the In-Line Security Device 1 with Processor 19

FIG. 3 illustrates an example of an in-line security device with a processor 19. The processor 19 enables the in-line security device 1 to perform additional functions. This may include, for example, responding to requests, authenticating request, encrypting and decrypting information, etc.

Figure 9:
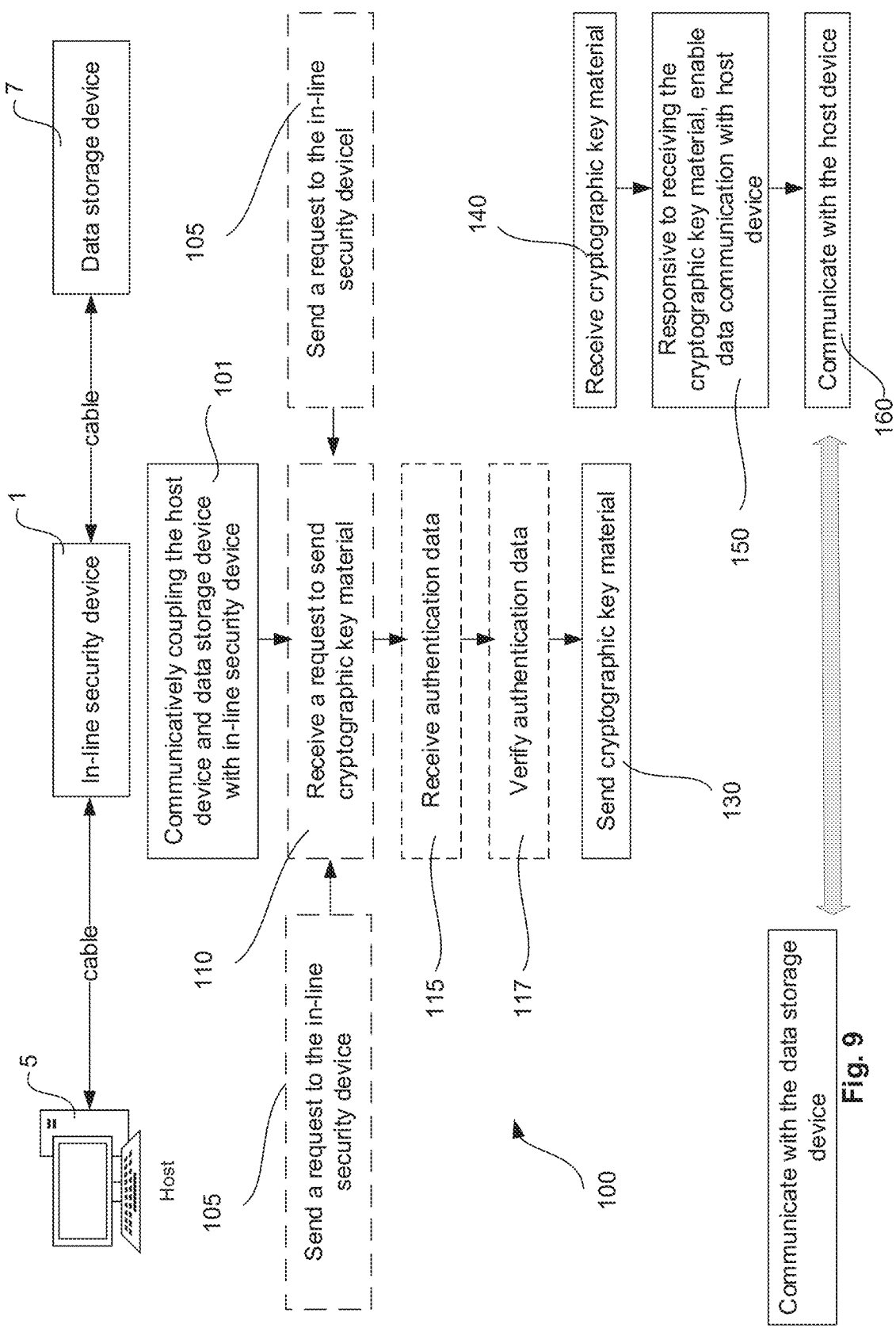
FIG. 9 is an example method for a data storage device to communicate with a host device via an in-line security device of FIG. 1, wherein cryptographic key material is sent from the in-line security device to the data storage device.

In one example, as illustrated in FIG. 9, the processor 19 is configured to receive 110 a request to send the cryptographic key material 3 to the data storage device 7. In some example, this request is sent 105 from the data storage device 7 in response to coupling 101 of the in-line security device 1 to the data storage device 7. In other examples, the request may be sent 105 from the data storage device 7 in response to a physical interaction with the data storage device 7, such as operation of a user interface. In other examples, the request is sent 105 from the host device 5 to initiate a communication session. In yet another example, the request may be initiated by a user interface at the in-line security device 1.

In response to the request, the processing device 19 can receive the cryptographic key material 3 from the cryptographic key memory 17 and then send 130 the cryptographic key material 3 to the data storage device 7 via the second connector 11.

In some examples, the processor 19 and in-line security device 1 is further configured to authenticate the request and/or determine the user is an authorized user. This may include the at least one processor receiving 115 authentication data that is associated with the request. For example, this may include a user name (or other identifier), a password, and/or other data for authentication. In some examples, this can include a user providing the authentication data at the in-line device, such as a user interface and/or biometric reader. In other examples, this can be received through other means such as from the host device, a wireless communication module, etc.

The processing device 19 is further configured to verify 117 the authentication data that can include verifying the authentication data corresponds to a record in an authentication data set. Based on successful verification, the processing device 19 can then enable sending 130 of the cryptographic key material 3 to the data storage device 7.

It is to be appreciated that processor 19 may include more than one processor 19 to perform such functions.

In some alternatives, the operation of the in-line security device 1 controls the visibility of what the host device 5 can see of the connected data storage device 7. In one example, the host device 5 provides power to both the in-line security device 1 and the data storage device 7. Upon physical connection of to the host device 5 to provide power, the data storage device 7 sends 105 a request for cryptographic key material 3. This request for cryptographic key material 3 can also include authentication identification data (to identify the data storage device 7 that has been connected). This can be useful where an in-line security device 1 is matched with a particular data storage device 7. Thus the cryptographic key material 3 is only transmitted via the connector 11 if the in-line security device 1 and connected data storage device 7 are matched, which can increase security. Once the data storage device 7 authenticates the received cryptographic key material 3, communication is enabled between the data storage device 7 and the host device 5. In this example, the host 5 only sees 7 as an unencrypted drive. If the authentication between in-line security device 1 and the data storage device 7 fails, the host device 5 never mounts the data storage device 7 as a drive.

In some examples, there are multiple partitions on the data storage device 7 where only one or more partitions are decrypted and mounted (from the perspective of the host device 5) if the above case where the in-line security device 1 and data storage device 7 matches. This would enable a partition to be always unencrypted and to mount while the other partitions may be hidden and never mount unless the cryptographic key material 3 of the in-line security device 1 is configured to enables such access.

Alternatively, there can be cryptographic key material 3 inside the in-line security device 1 that is specifically for the host device 5 to decrypt individual files at the host device 5 itself. This enables a hybrid approach of volume, partition, and file granularity for encryption.

Fourth Example of the In-Line Security Device 1 with Biometric Reader 41

FIG. 4 illustrates an example of an in-line security device 1 that includes a biometric reader 41. The biometric reader 41 is configured to read biometric data 45 of the user. Based on the biometric data 45, the communication interface 45 sends cryptographic key material 3 to the data storage device 7.

In some examples, the biometric reader 41 is a fingerprint scanner and the biometric data 45 includes, or is based on, the fingerprint of a user. In other examples, the biometric reader 41 may be based on scanning other biometrics such as the retina, iris, facial features, etc. This can include scanners that include cameras, or other image capture devices, LIDAR (light detection and ranging) scanners, etc.

Figure 10:
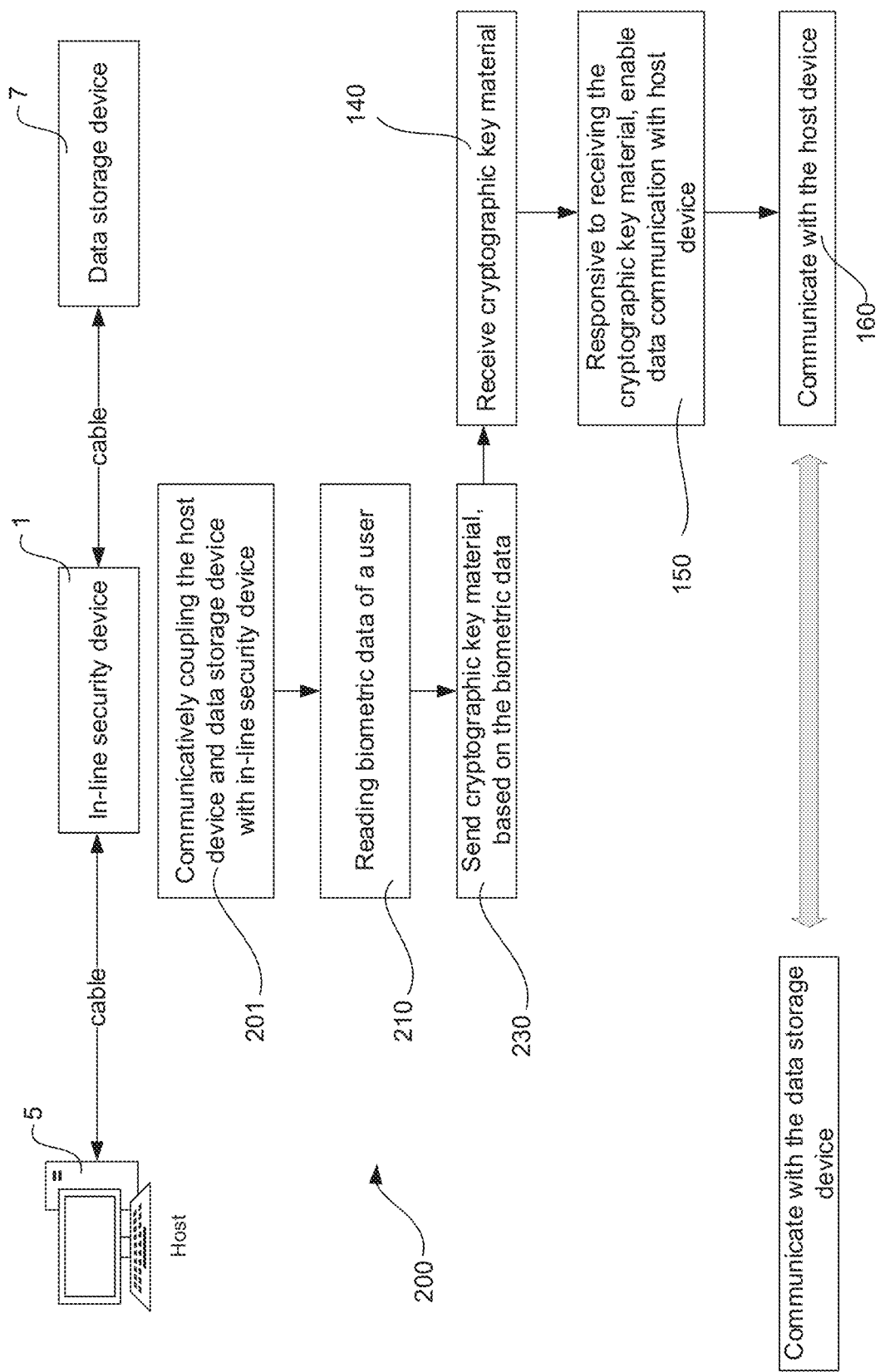
FIG. 10 is an example method for a data storage device to communicate with a host device via an in-line security device of FIG. 4, wherein communication is enabled by reading valid biometric data of a user at the in-line security device.

In some examples, the cryptographic key material 3 is, at least in part, based on the received biometric data 45. That is, user's own biometric features form the cryptographic key material 3. Referring to FIG. 10, the method 200 may include coupling the host device 5 and the data storage device 7 with the in-line security device 1. The biometric data 45 of the user is read 210 and the cryptographic key material 3, based on the biometric data 4, is sent 230 to the data storage device 7. Similar to the above mentioned examples, the data storage device 7 receives 140 the cryptographic key material to enable 150 data communication with the host device 5.

This can increase security as the cryptographic key material 3 is not entirely on the in-line security device 1. Therefore even if a nefarious user were to access and read all parts of the in-line security device 1, including the memory 17, it will be impossible for that nefarious user to determine the cryptographic key material 3 based on the information at the in-line security device 1.

In another example, this can be further advantageous in that multiple in-line security devices 1 could be used to access the data storage device 7, whilst maintaining security that only a person with the corresponding biometric features can enable use of the system. For example, a primary and spare in-line security device 1 are manufactured for use, along with the user's biometric data 45, with the data storage device 7. If the primary in-line security device 1 is lost or stolen, a thief will not be able to use the in-line security device 1 as they do not have the biometric data 45 to enable the cryptographic key material 3 to be generated and sent to the data storage device 7. At the same time, the authorized user can still use the spare in-line security device 1 to access and retrieve data from the data storage device 7.

In yet further examples, the in-line security device 1 are non-specific devices that do not contain any cryptographic or sensitive material. That is, the in-line security device 1 can be shared amongst different users. Furthermore, if an in-line security device 1 is lost, a replacement can be used by a user without specific registration of the in-line security device 1 as the cryptographic key material 3 is based on the user's biometric data 45.

Figure 11:
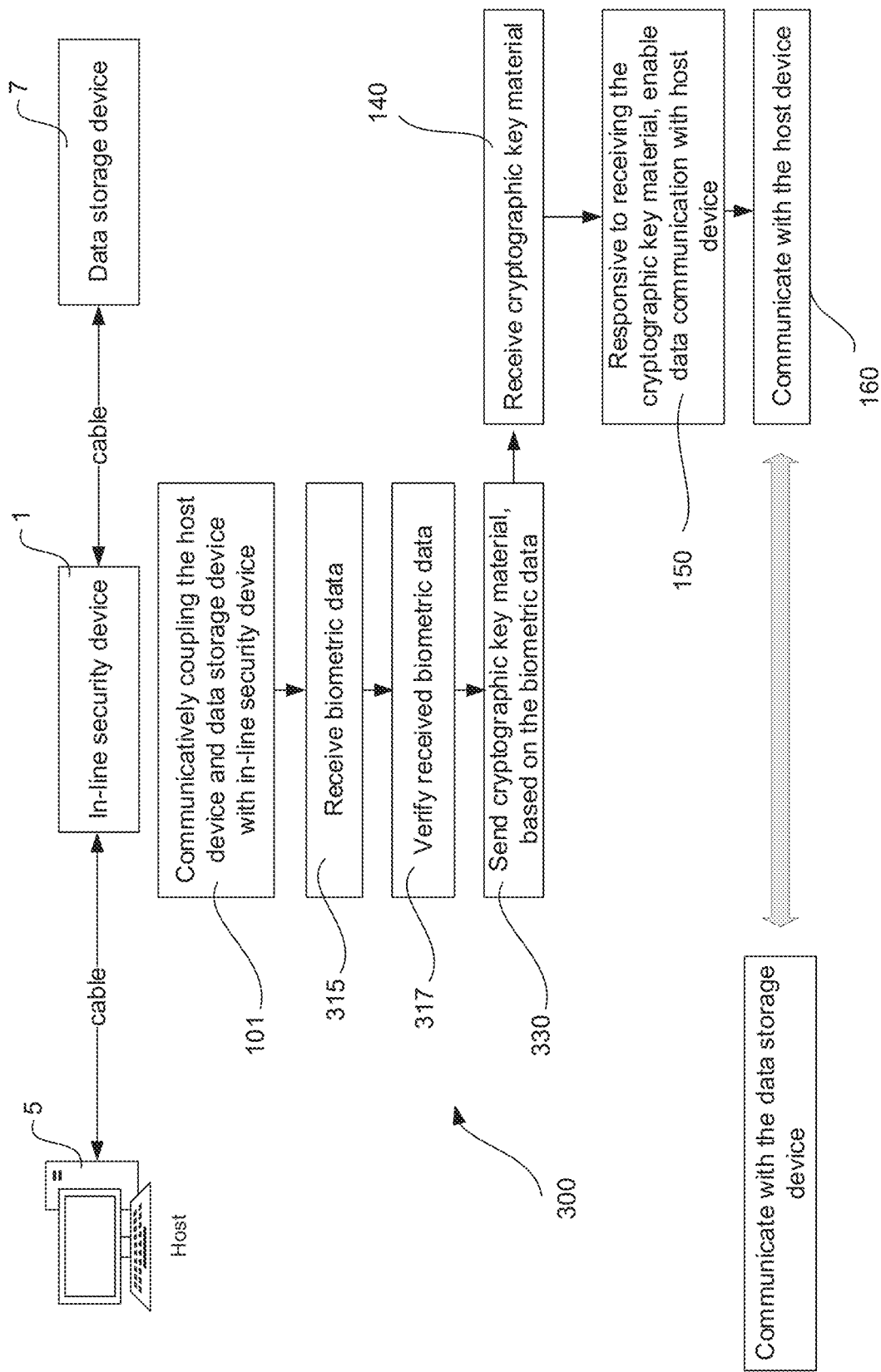
FIG. 11 is example method for a data storage device to communicate with a host device via an in-line security device of FIG. 5, wherein communication is enabled by reading biometric data of a user at the in-line security device and verifying the biometric data at the in-line security device.

In alternative examples, the in-line security device 1 is configured to authenticate a user's biometric data 45 at the in-line security device 1 to enable sending of the cryptographic key material 3 to the data storage device 7. As illustrated in FIG. 11, this may include the biometric reader 41 sending the biometric data 45 to be received 315 by a processor 19 of the in-line security device 1. The processor 19 may then verify 317 that the received biometric data 45 corresponds to a record as discussed in additional detail below.

Fifth Example of the In-Line Security Device 1 with Biometric Reader for Authentication FIGS. 5 and 11 illustrate another example of the in-line security device 1, where the device 1 is configured to authenticate a user's biometric data 45 to enable sending of the cryptographic key material 3 to the data storage device 7. As illustrated in FIG. 11, this may include the biometric reader 41 sending the biometric data 45 to be received 315 by a processor 19 of the in-line security device 1. The processor 19 may then verify 317 that the received biometric data 45 corresponds to a record in a biometric authentication data set. The biometric authentication data set may be stored in memory 17 to be retrieved by the processor 19. Based on verification of the received authentication data, the processor 19 sends 330 cryptographic key material 3 to the data storage device 3 via the second connector.

In some examples, the cryptographic key material 3 is stored in the memory 17 and retrieved and sent to the data storage device 7 upon verification. In other examples, at least part of the cryptographic key material may be based on the biometric data, and/or the biometric authentication data set. In yet further examples, at least part of the cryptographic key material 3 is based on other authentication data provided by the user.

Sixth Example of the In-Line Security Device 1 with Integrated Cable 10, 12

FIG. 6 illustrates another example of the in-line security device 1, where the device includes a cable 10, 12. The cable 10, 12 may include a flexible set of wires to carry electrical signals. In this example, components such as the communication interface 15 and at least part of the pass-through circuit 13 are housed in a body 4 on the in-line security device 1. A cable 10 links the first connector 9 to the body. Similarly, another cable 12 links the body 4 to the second connector 11.

Advantageously this example of the in-line security device 1 enables direct coupling to the host device 5 and data storage device 7 without separate cables or wires. It is to be appreciated that other variations can include a single cable 10, such as a distally located first connector 9 linked by cable 10 whilst the second connector 11 is at the body 4. Another variation can include the first connector 9 at the body 4 whilst the second connector 11 is distal to the body 4 and linked by cable 12.

Seventh Example of the In-Line Security Device with Internal Storage and Wireless Communication FIG. 7 illustrates an example of an in-line security device 1 with additional components such as a wireless communication module 61 and internal storage medium 63.

The wireless communication module 61 may utilize industry standard communication protocols such as Wi-Fi (IEEE 802.11) and/or Bluetooth (IEEE 802.15.1) to communicate with other devices such as the host device 5 and/or the data storage device 7. In some examples, the wireless communication module 61 is used to initiate the process of transferring the cryptographic key material 3. For example, the wireless communication module 61 receives 110 the request for the cryptographic key material 3 from the host device 5 and/or data storage device 7. This may include the data storage device 7, on connection by wire 10 to a device, sending a request for cryptographic key material 3 from a wireless communication module 61 in the data storage device 7. Alternatively or in conjunction, the host device 5 on connection by wire 10 to the in-line security device may send a request to send the cryptographic key material 3 to the data storage device 7.

In other examples, the wireless communication module 61 receives 115 the authentication data for the in-line security device. For example, a user may provide a password or other authentication data to a user interface (such as a keyboard at the host device 5) and, in turn, the authentication data is sent to the wireless communication module 61 of the in-line security device 1 for verification 117. In some other examples, the wireless communication module 61 can receive a password or cryptographic key material from another electronic device such as a phone or computer. This password or cryptographic key material can be passed directly to the data storage device 7 via the second connector 11. Alternatively, the password or cryptographic key material is further processed at the in-line security device 1 before transferring cryptographic key material to the data storage device 7 via the second connector 11.

The in-line security device may also have an internal storage medium 63 to store data that can be accessed by the host device 5. In some examples, the internal storage medium 63 is also configured to store data that can be accessed by the data storage device 7.

In one example, the internal storage medium 63 of the in-line security device 1 can be used independently as an alternative storage medium. For example, data can be read from, and written to, the in-line security device 1 by coupling the device 1 to the host device 5. That is, using the in-line security device 1 as a peripheral storage device (e.g. as a USB thumb drive). In some examples, this can be used without connecting to the data storage device 7.

In other examples, the internal storage medium 63 is used to store data relevant to the function of the in-line security device 1 and data storage device 7. For example, this can include device drivers, configuration data, or other software (such as configuration software) that can be sent from the internal storage medium 63 of in-line security device 1 to a coupled host device 5. In other examples, the internal storage medium 63 may store data in the form of software and firmware updates. It is to be appreciated that the internal storage medium 63 may store firmware updates that are sent to the coupled data storage device 7.

In some examples, the in-line security device 1 is integrated to other products that serve additional purposes. A noted above, one example is having the product with an alternative function as a USB thumb drive. In other examples, the in-line security device 1 has additional functionality as a universal $2^{nd}$ factor FIDO key for the host device 5.

Example of a Secure Data Storage System 2 with Multiple In-Line Security Devices.

Figure 8:
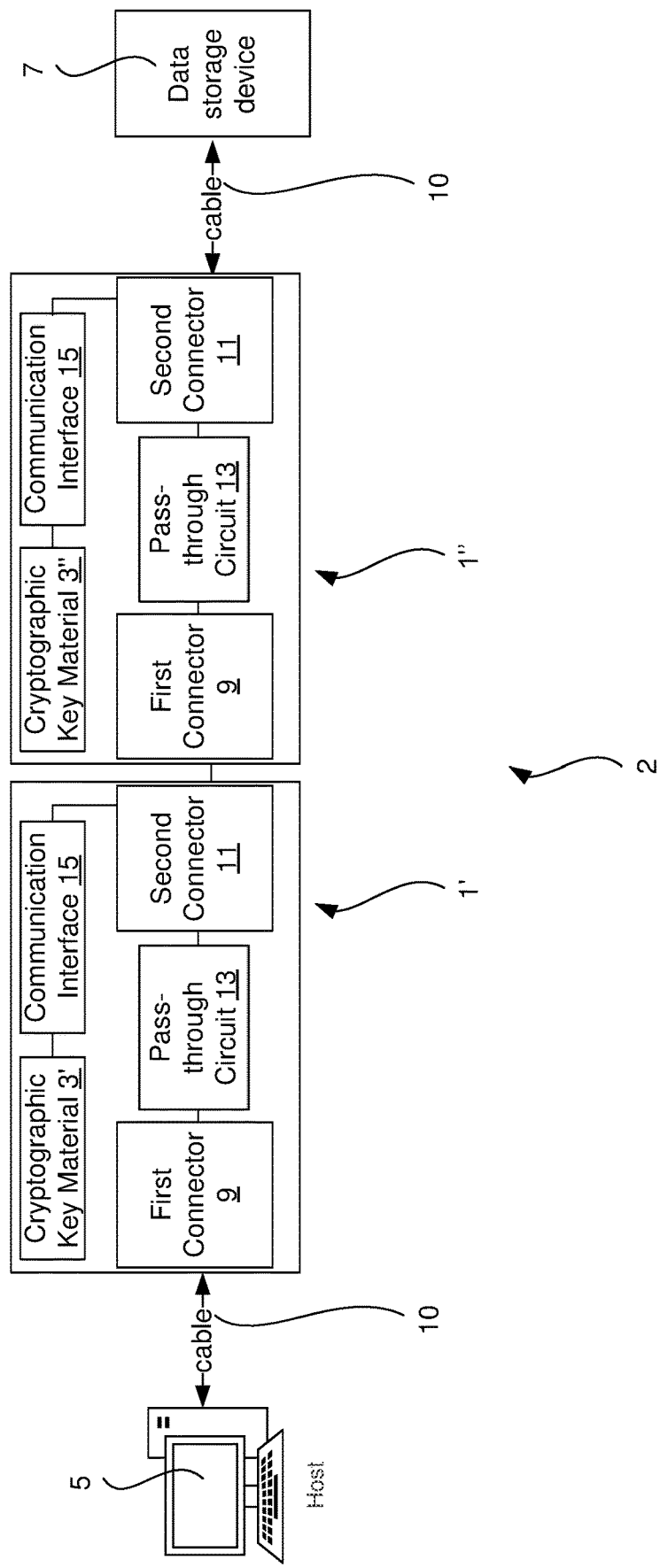
FIG. 8 is a schematic diagram of a secure data storage device system wherein multiple in-line security devices are connected between a data storage device and a host device.

An example of a secure data storage system 2 that includes multiple in-line security devices 1', 1" will now be described with reference to FIGS. 8 and 12. In this system, multiple in-line security devices 1', 1" are coupled, in-line between the host device 5 and the data storage device 7. The respective multiple cryptographic key material 3', 3" from the multiple in-line security devices 1', 1" are sent via wire 10 to the data storage device 7. This can be facilitated by the pass-through circuits 13 of each of the in-line security device 1 that is configured to facilitate communication of further cryptographic key material 3 between the first connector 9 and the second connector 11 of the in-line security device 1.

The data storage device 7 may use the multiple cryptographic key material 3', 3" in a number of ways (depending on the configuration). In one example, each of the cryptographic key material 3', 3" is used by the cryptography engine 8 of the data storage device 7 to access a respective portion of the storage medium 6.

In one example of use, Alice has a first in-line security device 1' to enable access to a first portion of the storage medium 6 of the data storage device. Bob has a second in-line security device 1" to enable access to a second portion of the storage medium 6 of the data storage device. Say both Alice and Bob want to transfer a file from the first portion to the second portion. They can both provide their respective physical in-line security devices 1', 1" and couple them in-line between the host device 5 and the data storage device 7. The respective two cryptographic key material 3', 3" are sent to the data storage device to enable access (including reading and writing) with the two corresponding portions of the storage medium.

In another example of use, the multiple cryptographic key material 3', 3" are combined to form a combined cryptographic key. For example, security policy requires the in-line security devices 1', 1" of two users to access the data in the data storage device 7. Thus Charlie has a first in-line security device 1', Dave has a second in-line security device 1". To access the data storage device 7, the two in-line security devices 1', 1" are coupled between the host device 5 and the data storage device 7 so that the respective cryptographic key materials 3', 3" are sent to the data storage device 7. The two cryptographic key materials 3', 3" are combined to form a combined cryptographic key to enable access to the storage medium 6 (or a corresponding portion of the storage medium 6).

Figure 12:
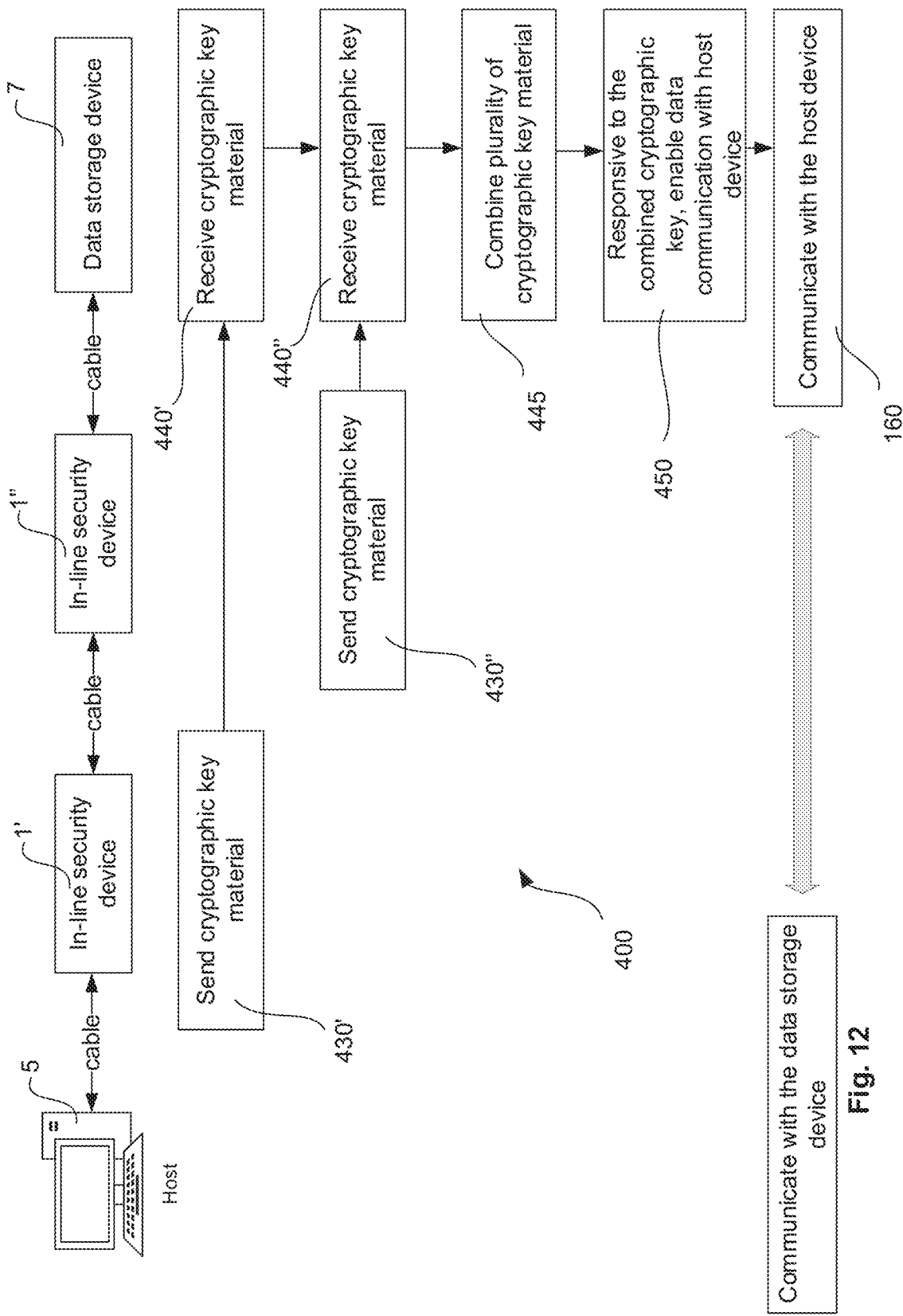
FIG. 12 is example method for a data storage device to communicate with a host device via multiple in-line security devices as illustrated in FIG. 8, wherein communication is enabled the multiple in line security devices sending respective cryptographic key material to the data storage device.

This later example is best illustrated in FIG. 12 where the respective cryptographic keys are sent 430', 430" from the in-line security devices 1', 1" and received 440', 440" at the data storage device 7. At the data storage device 7, the cryptography engine 8 combines 445 the plurality of cryptographic key material 3', 3" to generate a combined cryptographic key, wherein the combined cryptographic key enables 450 access to the storage medium 6. This enables communication 160 of data between the host device 5 and data storage device 7 of data to and from that storage medium 6

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. An in-line security device to transfer cryptographic key material, the in-line security device comprising:
    a first connector configured to connect with a host device;
    a second connector configured to connect with a data storage device;
    a pass-through circuit between the first connector and the second connector to facilitate data communication between the host device and the data storage device, wherein the pass-through circuit comprises:
        a first set of circuits configured to connect data transmit and receive pins of the first connector to data transmit and receive pins of the second connector for data communication between the host device and the data storage device; and
        a second set of circuits configured to connect channel configuration pins of the first connector to channel configuration pins of the second connector; and
    a communication interface configured to send, using the channel configuration pins of the second connector, a part of a plurality of parts of the cryptographic key material to a cryptography engine in the data storage device, wherein the cryptography engine is configured to decrypt, using a cryptographic key generated based on combining the plurality of parts of the cryptographic key material including the part of the plurality of parts of the cryptographic key material, encrypted data stored in a storage medium of the data storage device.

2. The in-line security device according to claim 1, wherein the communication interface is further configured to decouple the channel configuration pins of the first connector from the channel configuration pins of the second connector prior to sending the part of the cryptographic key material.

3. The in-line security device according to claim 1, further comprising at least one processor configured to:
    receive a request to send the part of the plurality of parts of the cryptographic key material; and
    responsive to receiving the request, send the part of the plurality of parts of the cryptographic key material to the data storage device via the second connector.

4. The in-line security device according to claim 1, further comprising:
    at least one processor configured to:
        receive authentication data or at least part of the cryptographic key material;

verify that the received authentication data or the at least part of the cryptographic key material corresponds to a record in an authentication data set; and
based on verification of the received authentication data or the at least part of the cryptographic key material, send the part of the plurality of parts of the cryptographic key material to the data storage device via the second connector.

5. The in-line security device according to claim 1, wherein the pass-through circuit further comprises a third set of circuits configured to connect power pins of the first connector to power pins of the second connector to enable power communication between the host device and the data storage device.

6. The in-line security device according to claim 1, further comprising:
a biometric scanner device configured to read biometric data of a user, wherein the communication interface is further configured to send, based on the biometric data, the part of the plurality of parts of the cryptographic key material to the data storage device.

7. The in-line security device according to claim 6, wherein the biometric scanner device is a fingerprint scanner.

8. The in-line security device according to claim 6, wherein the cryptographic key material is, at least in part, based on the read biometric data.

9. The in-line security device according to claim 6, further comprising:
a processor configured to:
receive the biometric data;
verify that the received biometric data corresponds to a record in a biometric authentication data set; and
based on verification of the received biometric data, send the part of the plurality of parts of the cryptographic key material to the data storage device via the communication interface and the second connector.

10. The in-line security device according to claim 1, wherein:
the cryptographic key material is a first cryptographic key material configured to enable access to a first corresponding portion of the storage medium in the data storage device; and
a second cryptographic key material is configured to enable access to a second corresponding portion of the storage medium in the data storage device.

11. The in-line security device according to claim 1, further comprising a memory configured to store first cryptographic key material, wherein:
the plurality of parts of the cryptographic key material includes the first cryptographic key material;
the first cryptographic key material is a part of a combined cryptographic key; and
the cryptography engine is further configured to use the combined cryptographic key as the cryptographic key for decrypting encrypted data stored in the storage medium of the data storage device.

12. The in-line security device according to claim 11, wherein:
a second in-line security device is configured to store second cryptographic key material for the combined cryptographic key;
the second in-line security device is configured to connect to the first connector and the host device; and the pass-through circuit is further configured to facilitate communication of the second cryptographic key material between the first connector and the second connector.

13. A data storage device comprising:
means for selectively connecting to an in-line security device, the in-line security device comprising:
a first connector configured to connect with a host device;
a second connector configured to connect with the means for selectively connecting to the in-line security device; and
a pass-through circuit between the first connector and the second connector to facilitate data communication between the host device and the data storage device, wherein the pass-through circuit comprises:
a first set of circuits configured to connect data transmit and receive pins of the first connector to data transmit and receive pins of the second connector for data communication between the host device and the data storage device; and
a second set of circuits configured to connect channel configuration pins of the first connector to channel configuration pins of the second connector;
means for receiving, using the channel configuration pins of the second connector, at least part of cryptographic key material from the in-line security device;
means for storing data configured to store user content data; and
means for cryptography, wherein access to the means for storing data is enabled by the means for cryptography:
receiving a part of a plurality of parts of the cryptographic key material from the in-line security device; and
decrypting, using a cryptographic key generated based on combining the plurality of parts of the cryptographic key material including the part of the plurality of parts of the cryptographic key material, encrypted user content data stored in the means for storing data.

14. The data storage device according to claim 13, wherein the means for cryptography is configured to use the cryptographic key material to, at least in part, encrypt and decrypt the user content data stored on the means for storing data.

15. The data storage device according to claim 13, further comprising:
means for sending, via the means for selectively connecting to an in-line security device, a request for the part of the plurality of parts of the cryptographic key material.

16. The data storage device according to claim 13, wherein the means for cryptography further comprises:
means for receiving the plurality of parts of the cryptographic key material from a plurality of in-line security devices; and
means for combining the plurality of parts of the cryptographic key material to generate a combined cryptographic key, wherein the means for cryptography uses the combined cryptographic key as the cryptographic key.

17. The data storage device according to claim 13, wherein the means for cryptography further comprises:
means for receiving a plurality of cryptographic key material, wherein each of the plurality of cryptographic key material enables access to a corresponding portion of the means for storing data.

18. A method for a data storage device to communicate with a host device, the method comprising:
  storing cryptographic key material in an in-line security device;
  communicatively coupling, via wire, the host device to a first connector of the in-line security device;
  communicatively coupling, via wire, the data storage device to a second connector of the in-line security device;
  sending, through a pass-through circuit between the first connector and the second connector, data communication between the host device and the data storage device, wherein the pass-through circuit comprises:
    a first set of circuits configured to connect data transmit and receive pins of the first connector to data transmit and receive pins of the second connector for data communication between the host device and the data storage device; and
    a second set of circuits configured to connect channel configuration pins of the first connector to channel configuration pins of the second connector;
  sending, using the channel configuration pins of the second connector, a part of a plurality of parts of the cryptographic key material from the in-line security device to the data storage device; and
  responsive to receiving the cryptographic key material, enabling data communication to a storage medium of the data storage device by decrypting, using a cryptographic key generated based on combining the plurality of parts of the cryptographic key material including the part of the plurality of parts of the cryptographic key material, encrypted user content data stored in the storage medium of the data storage device.

19. The method according to claim 18, further comprising:
  reading, with a biometric reader in the in-line security device, biometric data of a user, wherein the cryptographic key material is based on the biometric data.

20. The method according to claim 18, further comprising:
  receiving, by the in-line security device, authentication data; and
  verifying, by the in-line security device, that the received authentication data corresponds to a record in an authentication data set, wherein sending the part of the plurality of parts of the cryptographic key material to the data storage device is based on verification of the received authentication data.

* * * * *